United States Patent
Eda et al.

(10) Patent No.: US 10,223,172 B2
(45) Date of Patent: *Mar. 5, 2019

(54) OBJECT STORAGE WORKFLOW OPTIMIZATION LEVERAGING STORAGE AREA NETWORK VALUE ADDS

(71) Applicant: International Business Machines Corporation, Armonk, NY (US)

(72) Inventors: Sasikanth Eda, Andhra pradesh (IN); John T. Olson, Tucson, AZ (US); Sandeep R. Patil, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 15/150,581

(22) Filed: May 10, 2016

(65) Prior Publication Data
US 2017/0329647 A1    Nov. 16, 2017

(51) Int. Cl.
G06F 9/46 (2006.01)
G06F 9/50 (2006.01)
G06F 3/06 (2006.01)

(52) U.S. Cl.
CPC ............ *G06F 9/5083* (2013.01); *G06F 3/061* (2013.01); *G06F 3/067* (2013.01); *G06F 3/0635* (2013.01); *G06F 2206/1012* (2013.01)

(58) Field of Classification Search
CPC .... G06F 9/5083; G06F 9/5005; G06F 9/5011; G06F 9/5027; G06F 3/067; G06F 3/0629; G06F 3/0604
See application file for complete search history.

(56) References Cited

U.S. PATENT DOCUMENTS

| 6,473,774 B1* | 10/2002 | Cellis ................ G06F 17/30339 |
| 8,706,782 B2 | 4/2014 | Cohen et al. |
| 8,775,663 B1 | 7/2014 | Singh |
| 9,383,924 B1 | 7/2016 | Fullbright et al. |

(Continued)

OTHER PUBLICATIONS

List of IBM Patents or Applications Treated as Related, May 10, 2016, 2 pages.

(Continued)

*Primary Examiner* — Emerson C Puente
*Assistant Examiner* — Zhi Chen
(74) *Attorney, Agent, or Firm* — Francis Lammes; Stephen J. Walder, Jr.; Robert M. Sullivan

(57) ABSTRACT

A mechanism is provided for optimizing object storage workflow. A category of a computational algorithm received from a user of a client device is identified, the category identifying a set of storage area network (SAN) features that are optimal for executing the computational algorithm. Features associated with a plurality of nodes in a plurality of infrastructures in an object storage architecture are searched for at least one node that has the set of features identified by the category of the computational algorithm. Responsive to identifying a node that has the set of features identified by the category of the computational algorithm, a determination is made as to whether resources associated with the node are immediately available. Responsive to the resources associated with the node being immediately available, the computational algorithm is issued to the node for execution.

20 Claims, 5 Drawing Sheets

(56) References Cited

U.S. PATENT DOCUMENTS

| | | | |
|---|---|---|---|
| 2002/0049608 A1* | 4/2002 | Hartsell | G06Q 10/10 709/226 |
| 2006/0294238 A1 | 12/2006 | Naik et al. | |
| 2007/0136384 A1* | 6/2007 | Hepper | G06F 3/0605 |
| 2008/0059556 A1 | 3/2008 | Greenspan et al. | |
| 2009/0268903 A1 | 10/2009 | Bojinov et al. | |
| 2009/0293022 A1 | 11/2009 | Fries | |
| 2013/0117206 A1* | 5/2013 | Craig | G06F 15/18 706/20 |
| 2013/0121178 A1* | 5/2013 | Mainaud | H04W 40/12 370/252 |
| 2013/0151482 A1* | 6/2013 | Tofano | G06F 3/0641 707/692 |
| 2013/0268937 A1 | 10/2013 | Woo et al. | |
| 2013/0346615 A1 | 12/2013 | Gondi | |
| 2014/0047342 A1 | 2/2014 | Breternitz et al. | |
| 2014/0149794 A1 | 5/2014 | Shetty et al. | |
| 2014/0259012 A1 | 9/2014 | Nandlall et al. | |
| 2015/0019598 A1 | 1/2015 | Olderdissen et al. | |
| 2015/0071079 A1* | 3/2015 | Kadosh | H04L 45/04 370/237 |
| 2015/0235044 A1 | 8/2015 | Cohen et al. | |
| 2015/0269000 A1* | 9/2015 | Alexeev | G06F 3/0631 718/104 |
| 2015/0331704 A1 | 11/2015 | Abali et al. | |
| 2016/0066032 A1* | 3/2016 | Grant | G06F 17/30017 725/19 |
| 2016/0292013 A1* | 10/2016 | Li | G06F 9/5066 |

OTHER PUBLICATIONS

"Storlets: Making Swift More Software Defined Than Ever.", OpenStack Summit, https://www.openstack.org/summit/tokyo-2015/videos/presentation/storlets-making-swift-more-software-defined-than-ever, Tokyo, Japan, Oct. 29, 2015, 1 page.

Burt, Jeffrey, "IBM Looking to 'Storlets' to Manage Object Storage", http://www.eweek.com/print/storage/ibm-looking-to-storlets-to-manage-object-storage.html, posted May 15, 2014, 3 pages.

Rabinovici-Cohen, Simona et al., "Storlet Engine: Performing Computations in Cloud Storage", IBM Research Laboratory, http://domino.research.ibm.com/library/cyberdig.nsf/papers/7233ABCCEC84F0BF85257D3100559FD6, H-0320 (HAI1408-001), Haifa, Israel, Aug. 4, 2014, 13 pages.

Valverde, Juan et al., "Using SRAM Based FPGAs for Power-Aware High Performance Wireless Sensor Networks", Sensors, vol. 12, Issue 3, Basel, Switzerland, Feb. 28, 2012, 14 pages.

Crump, George, "Thin Provisioning Key Feature of Storage Virtualization", Thin Provisioning Key Feature of Storage Virtualization, Networkcomputing.com, Aug. 12, 2011, 4 pages.

* cited by examiner

OBJECT STORAGE WORKFLOW OPTIMIZATION LEVERAGING STORAGE AREA NETWORK VALUE ADDS

BACKGROUND

The present application relates generally to an improved data processing apparatus and method and more specifically to mechanisms for object storage workflow optimization leveraging storage area network virtualization value adds.

Traditionally, object storage is used for backup, archival, data mining, searching, analytics, and the like. FIG. 1 depicts an example of a traditional object storage architecture. Traditional object storage architecture 100 comprises two diverse infrastructures 102 and 112 that are accessible by client devices 120 and 122 via load balancer 124. Each of infrastructures 102 and 112 further comprise two node groups. The first node groups 104 and 114 comprise proxy nodes 104a-104n and 114a-114n that are used for distributed load handling/request handling from client devices 120 and 122 into the storage namespace. The second node groups 106 and 116, i.e. the storage namespace, comprises storage nodes 106a-106n and 116a-116n that are responsible for writing to the disks or storage subsystems and, in this illustrative architecture, purely serves as a storage unit repository. However, in order to analyze or extract any meaningful information from raw data retrieved from the storage nodes 106a-106n and 116a-116n in second node groups 106 and 116, the data must be sent back to client 120 and 122 or to an additional client 126 or compute node 128 for analysis.

With the evolution of embedded compute infrastructures with built-in object storage architecture, computation utilizing the data stored in these compute infrastructures is offloaded to storage units instead of using a traditional client device for computation purposes. FIG. 2 depicts an example of an embedded compute engine in an object storage (Storlet) architecture. As with the architecture shown in FIG. 1, storlet architecture 200 of FIG. 2 comprises two diverse infrastructures 202 and 212 that are accessible by client devices 220 and 222 via load balancer 224. Each of infrastructures 202 and 212 further comprise two node groups. The first node groups 204 and 214 comprise proxy nodes 204a-204n and 214a-214n that are used for distributed load handling/request handling from client devices 220 and 222 into the storage namespace. The second node groups 206 and 216, i.e. the storage namespace, comprises storage nodes 206a-206n and 216a-216n that are responsible for writing to the disks or storage subsystems.

However, in addition to the common infrastructure, storlet architecture 200 also comprises software engines 208 and 218 as shown within second node groups 206 and 216, respectively. In an alternative embodiment, software engines 208 and 218 may reside within first node groups 204 and 214. Utilizing software engines 208 and 218, any computation or analysis required by client device 220 or 222 may be implemented by software engine 208 or 218. However, a user of client devices 220 and 222 has to frame computational algorithm to perform the computation or analysis and has to deploy or pass the computational algorithm to software engine 208 or 218 at the time of the original request. Then software engine 208 or 218 sends the results of the computation back to the requesting user of client device 220 or 222. Therefore, storlet architecture 200 differs from the traditional object storage architecture 100 of FIG. 1 in that, storlet architecture 200 does not require any additional client or compute node to perform computation or analysis of the data. That is, second node groups 206 and 216 act as compute nodes and return any results back to the user.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for optimizing object storage workflow. The illustrative embodiment identifies a category of a computational algorithm received from a user of a client device. In the illustrative embodiment, the category identifies a set of storage area network (SAN) features that are optimal for executing the computational algorithm. In the illustrative embodiment, the set of SAN features comprise one or more of thin provisioning, tiering, compression, deduplication, Flash acceleration support, high/low speed disk rpm support, Active/Active replication, or encryption. The illustrative embodiment searches features associated with a plurality of nodes in a plurality of infrastructures in an object storage architecture for at least one node that has the set of features identified by the category of the computational algorithm. The illustrative embodiment determines whether resources associated with the node are immediately available in response to identifying a node that has the set of features identified by the category of the computational algorithm. The illustrative embodiment issues the computational algorithm to the node for execution in response to the resources associated with the node being immediately available. In the illustrative embodiment, execution of the computational algorithm returns results to the user via the client device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
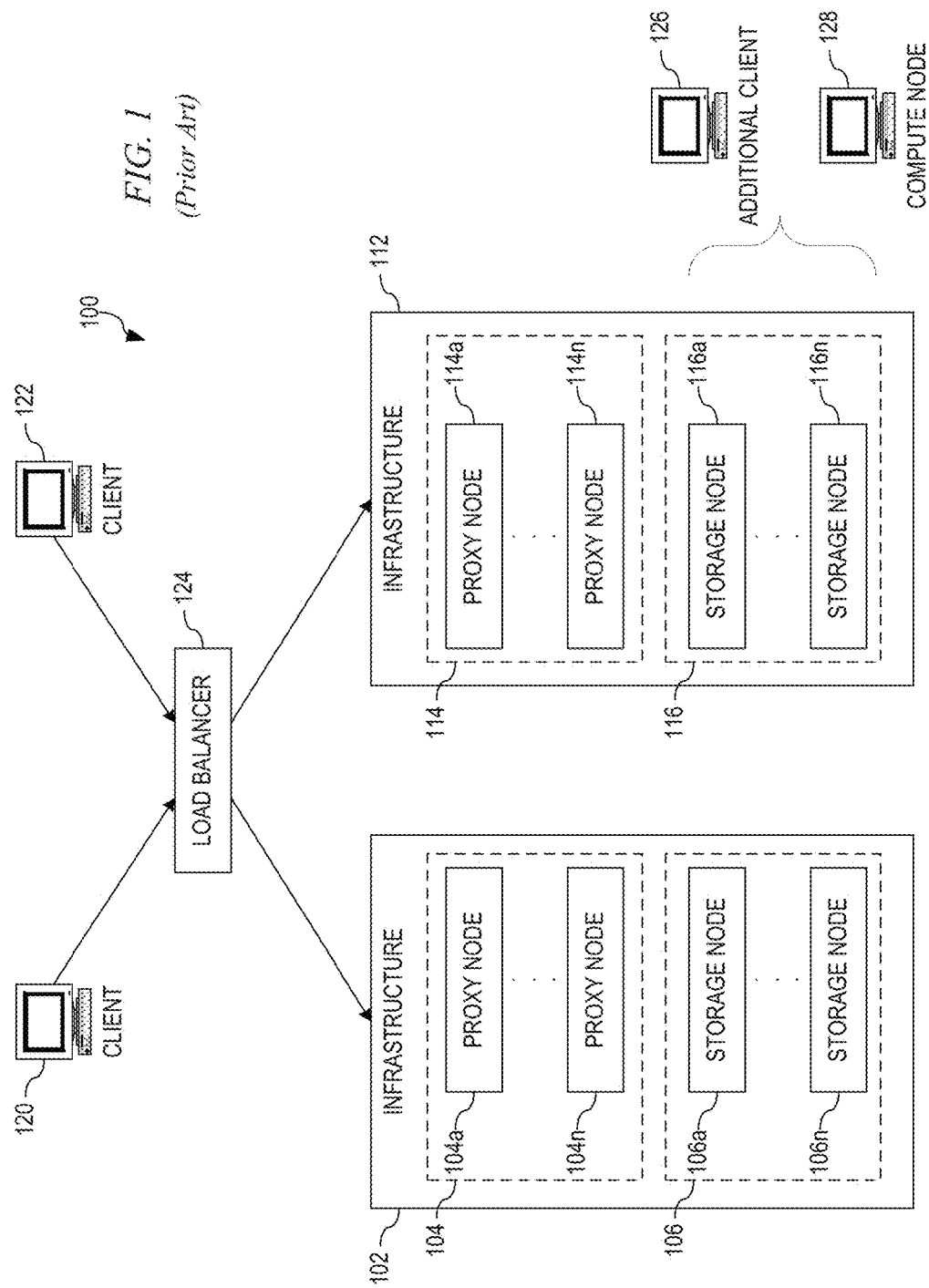
FIG. 1 depicts an example of a traditional object storage architecture.
Figure 2:
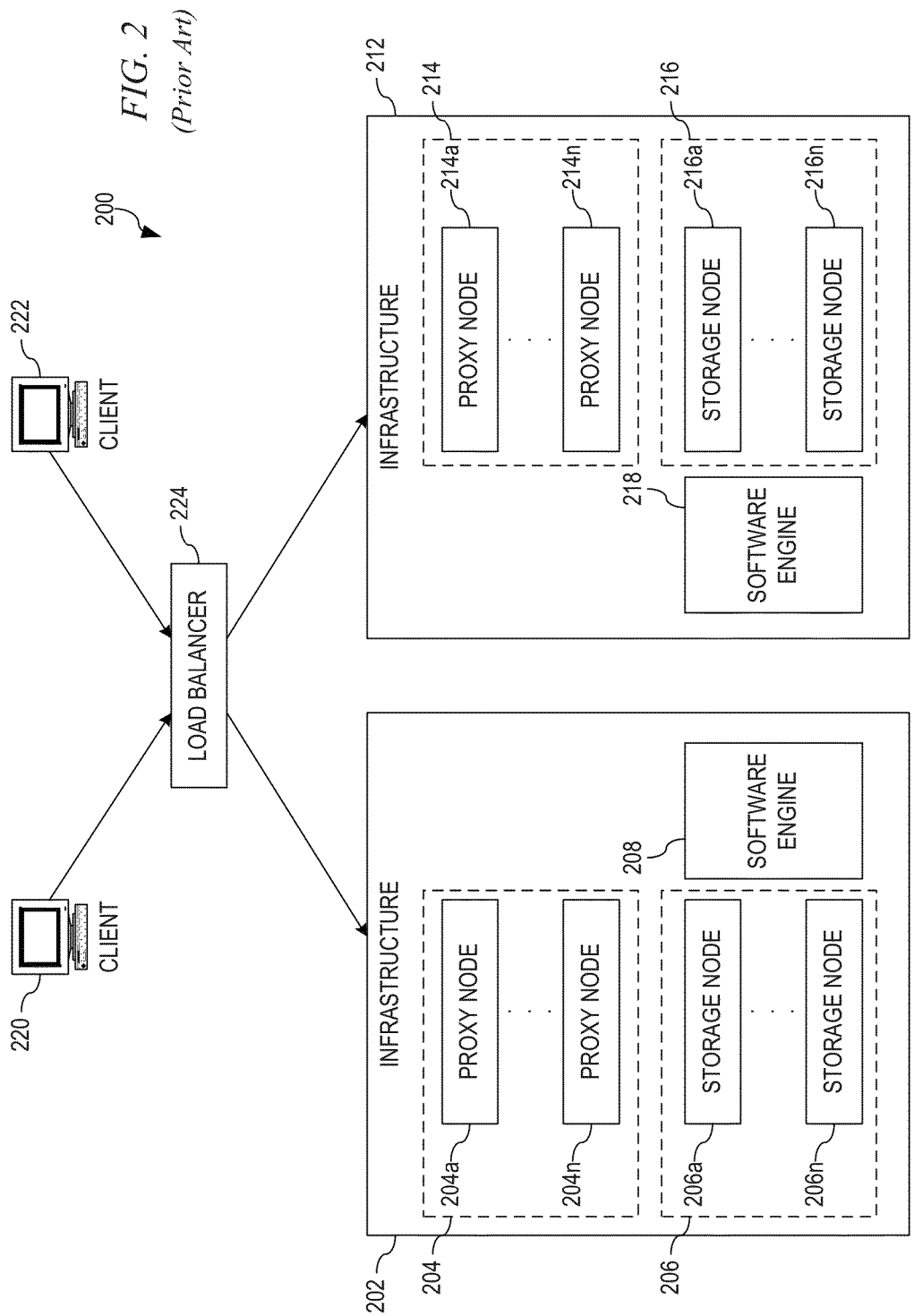
FIG. 2 depicts an example of an embedded compute engine in an object storage architecture.

As discussed previously, a storlet (embedded compute engine in an object storage) architecture comprises a software engine present within the nodes, the nodes being a storage node or a proxy node. When an end user wants the storlet architecture to perform a computation, the end user has to frame a computational algorithm and deploy or pass the computational algorithm to the embedded software engine as a normal object PUT operation. The storlet architecture does not require any additional client or compute node to perform analysis of the data. That is, in the storlet architecture, the storage nodes/proxy nodes themselves act as compute node and return computational results back to the end user. The storlet architecture also uses virtual machines, such as Linux™ containers, Docker, ZeroVM, or the like, deployed on the storage nodes/proxy nodes to perform the computation tasks.

Currently, datacenters comprise a plurality of servers that are coupled to shared pools of object storage devices via a storage area network (SAN) that is a dedicated high-speed network. A SAN moves storage resources off a common user network and reorganizes them into an independent, high-performance network. This allows each server to access the shared pools of object storage devices as if the shared storage were a storage drive directly attached to the server. When a host wants to access a storage device on the SAN, the host sends out a block based access request for the storage device. Value additions provided by SAN storage include, but are not limited to, thin provisioning, tiering, compression, deduplication, Flash acceleration support, high/low speed disk rpm support, Active/Active replication, encryption, or the like.

The storlet engine deployed within these object storage units which helps in preparing the hardware resources computation ready typically comprises a virtualization unit (may be Linux™ containers, Docker, ZeroVM, or the like) and few middleware's (software units) that helps decide the computation operation to be performed by the virtualization unit based on the user deployed computational algorithm. The signal flow graph corresponding to storlet engine is as follows:

user deploys computational algorithm (PUT operation)
    parse for syntax errors
    determine the computation operation (may be arithmetic or any specialized operation such as txt to pdf, editing jpg, or the like)
    determine the node to be used for instantiating virtualization unit
    pass the computation operation to virtualization unit
    virtualization unit pulls/reads/writes data based on the steps defined in the computational algorithm
    return results back to the user with code (success/failure).

The traditional storlet engine treats each node participating in the object storage cluster equally (irrespective of their type, model, operating system flavor, version, virtualization technology, etc.) and identifies the nodes unique using network address (IP address). With this kind of model, the storlet engine execution steps of: determining the node to be used for instantiating virtualization unit and passing the computation operation to virtualization unit, is achieved in two ways:

1. Virtualization unit may be instantiated on the node that comprises maximum data required for fulfilling that particular computational algorithm.
2. Virtualization unit may be instantiated on the node that comprises maximum available hardware resources.

Therefore, these scaled-out object storage units are built using commodity hardware mostly reusing the existing infrastructure. In a large enterprise environment, raw storage is primarily derived from a plurality of SAN appliances, either single or multi-vendor appliances, maintained as a pool and supplied to compute units depending upon their necessity. Without taking into consideration the features of the object storage units, such as hardware accelerators, disk speed, tiering, compression, deduplication, optimization efficiency, or the like, scheduling based on the above described two scheduling techniques proves to be less efficient in the case of a multi-SAN storage environment.

For example, in a scenario where in the storage servers used to build an object storage system are powered by volumes derived from multi-vendor SAN units (nodes 1, 2, and 3 being powered by storage derived from Hewlett-Packard® (HP®) SAN unit, nodes 4, 5, and 6 being powered by International Business Machines Corporation (IBM®) SAN unit, and nodes 7, 8, and 9 are powered by Hitachi® SAN unit, these SAN storage units contain different built-in features which helps the SAN storage units process faster in case of certain workloads. For example, HP® SAN volumes contain special hardware accelerators which provides faster processing of compression workloads, IBM® SAN volumes contain special ASIC (Application Specific Integrated Chip) which provides interaction with FLASH disks and provides faster processing of arithmetic workloads, Hitachi® SAN volumes contain special software which provides for faster image processing. In this scenario, assume an end user has deployed a computational algorithm that is identified as an arithmetic operation and both the IBM® and HP® storage units reported a similar resource availability. As current storlet engines treat all nodes as equal, the storlet engine receiving the computational algorithm may assign this computational algorithm to a node powered by HP storage unit for handling, which in turn results in poor performance in terms of increased time for processing and increased load on storage unit. That is, if the features of the SAN storage units were taken into consideration, the storlet engine would have selected the node powered by IBM storage unit for this workload which could deliver better results than any other nodes because the IBM® SAN volumes units contain special ASIC (Application Specific Integrated Chip) which provides interaction with FLASH disks and provides faster processing of arithmetic workloads.

The core reason for the above mentioned problem is lack of framework and middleware's which helps storlet engine (embedded compute infrastructure within object storage) to understand the underlying storage features and select the nodes based on the workloads (computational algorithm input) which can be accelerated using a particular SAN platform.

In order to perform object storage workflow optimization that leverages underlying storage features or value adds built into the SAN storage devices, such as thin provisioning, tiering, compression, deduplication, Flash acceleration support, high/low speed disk rpm support, Active/Active replication, encryption, or the like, the illustrative embodiments storlet scheduler mechanism installs a daemon on each infrastructure participating in the object storage cluster. This daemon collects the SAN storage features powering the storage nodes as well as the role executed by each node in the SAN storage (i.e. proxy or storage). Each daemon exports the collected information to the storlet scheduler mechanism. Using the collected storage information, for each node, the storlet scheduler mechanism identifies the underlying storage features along with the role served by the node (i.e. proxy or storage). For example, the information collected for a first node may reveal the SAN capabilities of: thin provisioning, tiering, compression, deduplication, and proxy node. As another example, the information collected for a second node may reveal the SAN capabilities of: replication, encryption, a disk speed of 7200 rpm, and storage node.

Responsive to receiving a deployed computational algorithm from an end user, the storlet scheduler mechanism parses the computational algorithm to identify the operations required within the computational algorithm. Utilizing the identified operations from the computational algorithm and a set of predefined rules for operations, the storlet scheduler mechanism identifies a class of each operation such as encryption, seismic processing, mobile/code render operations, compress and store, or the like. With the class of the operation identified, the storlet scheduler mechanism determines a category of the computational algorithm based on the identified class from a pre-programmed table of categories and value adds. Examples of category classification of deployed computational algorithm by the proposed middleware may include:

Computation operations (Encrypt an object)→Encryption category
Computation operations (Mobile development)→Developer category
Computation operations (Seismic data processing) →Arithmetic category
Computation operations (Compress and Store)→Direct Memory category For each category within the pre-programmed table of categories and value adds, the value adds associated with each category are preferred SAN features, such as encryption, Flash acceleration, deduplication, compression, or the like. Utilizing the identified category and value adds associated with the computational algorithm, the storlet scheduler mechanism searches the storage features associated with each node for features that best match the value adds associated with the identified category of the computational algorithm. Responsive to determining a best match node, the storlet scheduler mechanism schedules the computational algorithm to be executed on the best match node.

Thus, the mechanisms of the illustrative embodiments provide for a storlet scheduler mechanism that improves computation performance and reduces workload on the object storage units in a multi-vendor commodity SAN powered object storage environment by performing specific workflow changes in the embedded compute engine according to SAN features, such as thin provisioning, tiering, compression, deduplication, Flash acceleration support, high/low speed disk rpm support, Active/Active replication, encryption, or the like.

Having given an overview of operations in accordance with one illustrative embodiment, before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 3:
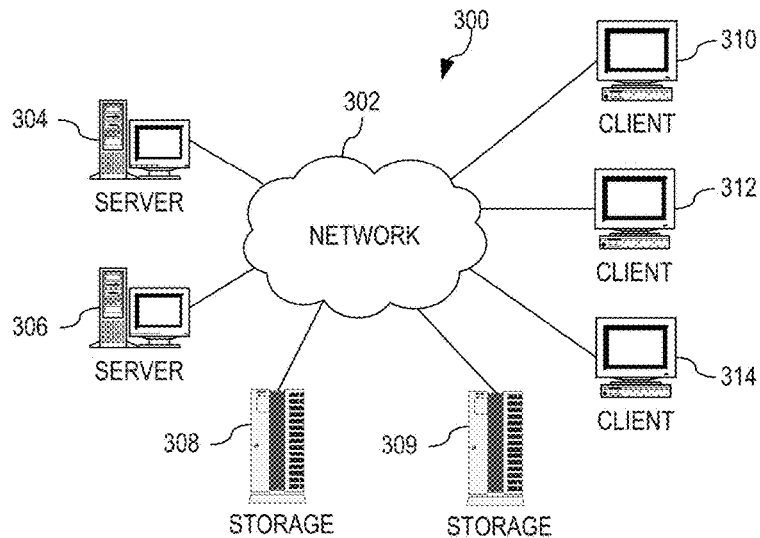
FIG. 3 is an example diagram of a distributed data processing system in which aspects of the illustrative embodiments may be implemented.
Figure 4:
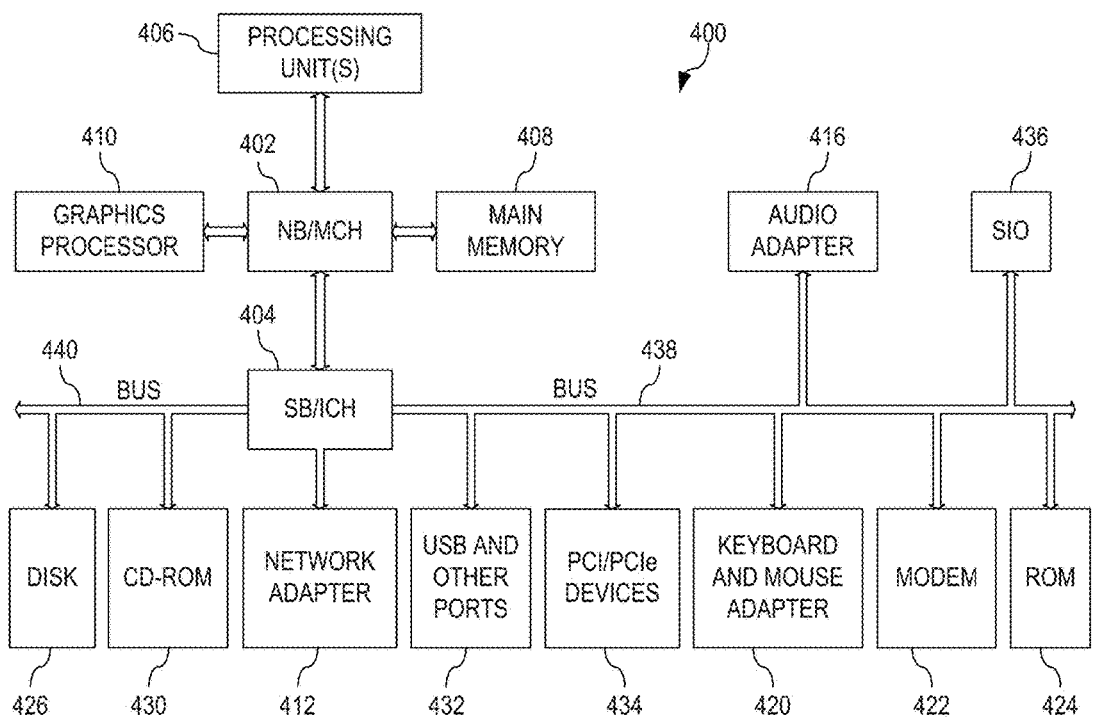
FIG. 4 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 3 and 4 are provided hereafter as example environments in which aspects of the illustrative embodiments may be implemented. It should be appreciated that FIGS. 3 and 4 are only examples and are not intended to assert or imply any limitation with regard to the environments in which aspects or embodiments of the present invention may be implemented. Many modifications to the depicted environments may be made without departing from the spirit and scope of the present invention.

FIG. 3 depicts a pictorial representation of an example distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 308 and storage unit 309. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

As shown in FIG. 3, one or more of the computing devices, e.g., storage unit 308 and storage unit 309, may be specifically configured to implement a storlet scheduler mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates improving computation performance and reducing workload on object storage units in a multi-vendor commodity SAN powered object storage environment by performing specific workflow changes in the embedded compute engine according to SAN storage value additions.

As noted above, the mechanisms of the illustrative embodiments utilize specifically configured computing devices, or data processing systems, to perform the operations for improving computation performance and reducing workload on object storage units in a multi-vendor commodity SAN powered object storage environment by performing specific workflow changes in the embedded compute engine according to SAN storage value additions. These computing devices, or data processing systems, may comprise various hardware elements that are specifically configured, either through hardware configuration, software configuration, or a combination of hardware and software configuration, to implement one or more of the systems/subsystems described herein. FIG. 4 is a block diagram of an example data processing system in which aspects of the illustrative embodiments may be implemented. Data processing system 400 is an example of a computer, such as server 304, storage unit 308, and client 310 in FIG. 3, in which computer usable code or instructions implementing the processes for illustrative embodiments of the present invention may be located.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 400.

As a server, data processing system 400 may be, for example, an IBM eServer™ System p® computer system, Power™ processor based computer system, or the like, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

As mentioned above, in some illustrative embodiments the mechanisms of the illustrative embodiments may be implemented as application specific hardware, firmware, or the like, application software stored in a storage device, such as HDD 426 and loaded into memory, such as main memory 408, for execution by one or more hardware processors, such as processing unit 406, or the like. As such, the computing device shown in FIG. 4 becomes specifically configured to implement the mechanisms of the illustrative embodiments and specifically configured to perform the operations and generate the outputs described hereafter with regard to a storlet scheduler mechanism that improves computation performance and reduces workload on the object storage units in a multi-vendor commodity SAN powered object storage environment by performing specific workflow changes in the embedded compute engine according to SAN storage value additions.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. In addition, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
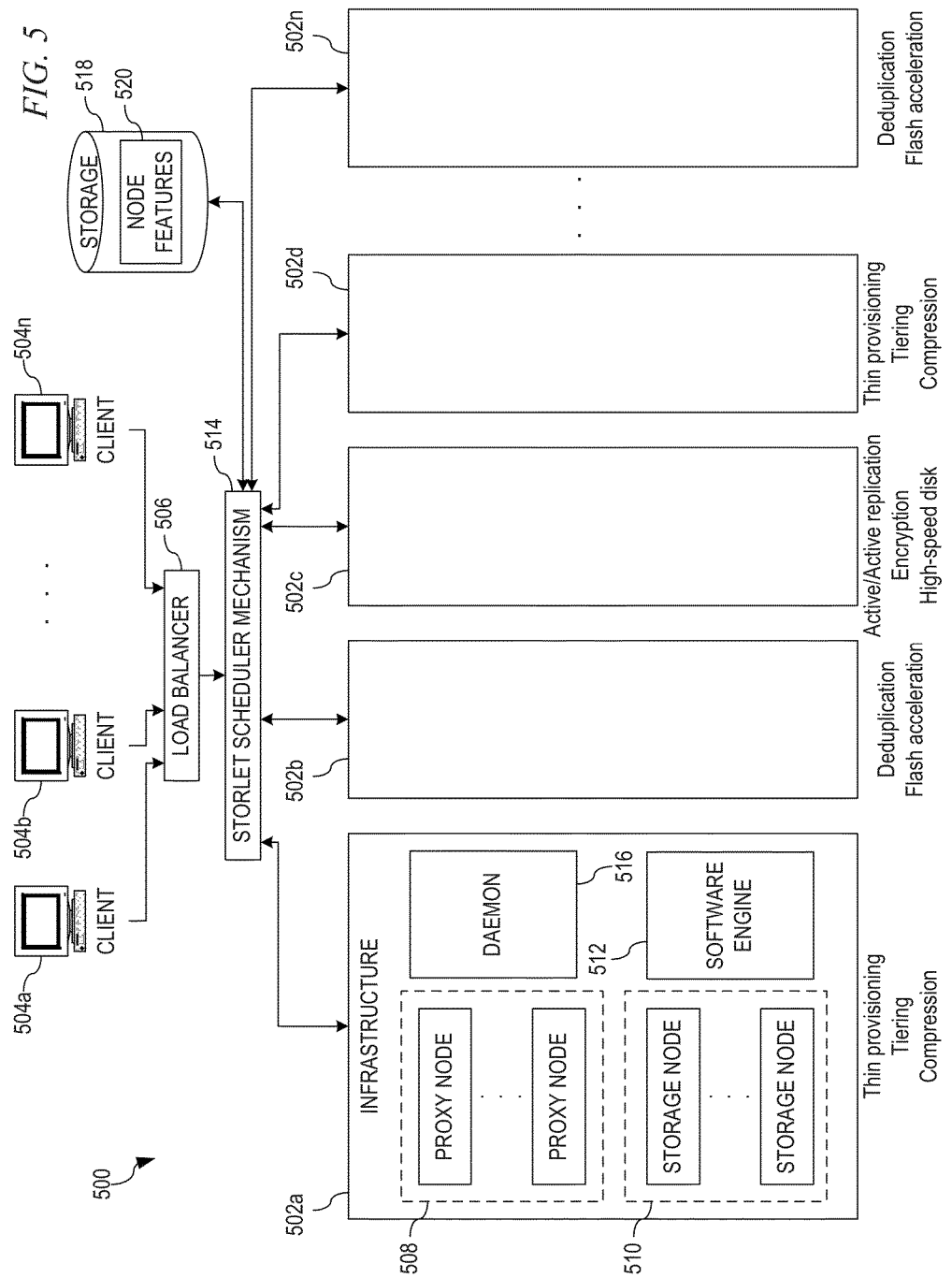
FIG. 5 depicts a functional block diagram of a storlet scheduler mechanism that improves computation performance and reduces workload on the storage area network (SAN) powered object storage units in accordance with one illustrative embodiment.

FIG. 5 depicts a functional block diagram of a storlet scheduler mechanism that improves computation performance and reduces workload on the storage area network (SAN) powered object storage units in accordance with one illustrative embodiment. Object storage architecture 500 comprises a plurality of diverse infrastructures 502a-502n that are accessible by client devices 504a-504n via load balancer 506. Each of infrastructures 502a-502n comprises a set of node groups 508 and 510. First node group 508 is proxy nodes that are used for distributed load handling/request handling from client devices 504a-504n into the storage namespace. Second node group 510 is storage nodes, i.e. the storage namespace, that are responsible for writing to the disks or storage subsystems. Further, each of the infrastructures 502a-502n comprise software engine 512. As discussed previously, embedded compute engine 512 performs any computation or analysis required by client devices 504a-504n. A user of client devices 504a-504n has to frame the computational algorithm to perform the computation or analysis and has to deploy or pass the computational algorithm to embedded compute engine 512 at the time the request is submitted. Embedded compute engine 512 then sends the results of the computation back to the requesting user of client device 504a-504n.

In accordance with the illustrative embodiments, in order to perform object storage workflow optimization that leverages underlying SAN storage value adds, object storage architecture 500 also comprises storlet scheduler mechanism 514. In operation, storlet scheduler mechanism 514 initially installs daemon 516 on each infrastructure participating in the object storage cluster. Daemon 516 collects SAN storage feature information, such as thin provisioning, tiering, compression, deduplication, Flash acceleration support, high/low speed disk rpm support, Active/Active replication, encryption, or the like, powering of the infrastructure on which the daemon 516 is installed as well as the role executed by each node (i.e. proxy or storage) on the infrastructure. Each daemon 516 exports the collected information from the node to storlet scheduler mechanism 514. Using the collected storage information, for each node, storlet scheduler mechanism 514 identifies the underlying storage features (value add features) along with the role served by the node (i.e. proxy or storage), which is then stored in storage 518 as node features 520. For example, the information collected from infrastructure 502*a* reveals the SAN features of: thin provisioning, tiering, and compression. The information from node 502*b* reveals the SAN features of: deduplication and Flash acceleration. The information from node 502*c* reveals the SAN features of: Active/Active replication, encryption, and high-speed disk. The information from node 502*d* reveals the SAN features of: thin provisioning, tiering, and compression. The information from node 502*n* reveals the SAN features of: deduplication and Flash acceleration. Again, each infrastructure may contain both proxy nodes and storage nodes. Therefore, for each node on the infrastructure, storlet scheduler mechanism 514 stores the operating system type, operating system version, virtualization technology, and hardware associated with that node. As an example, if infrastructure 502*a* comprises two proxy nodes and two storage nodes, storlet scheduler mechanism 514 would store the following in node features 520:

IN: 502*a*, Node 1: Proxy, thin provisioning, tiering, and compression.

IN: 502*a*, Node 2: Proxy, thin provisioning, tiering, and compression.

IN: 502*a*, Node 3: Store, thin provisioning, tiering, and compression.

IN: 502*a*, Node 4: Store, thin provisioning, tiering, and compression.

With the value add features of each node collected and stored, storlet scheduler mechanism 514 waits for a computational algorithm from a user of one of client devices 504*a*-504*n*. Responsive to receiving a computational algorithm from a user, storlet scheduler mechanism 514 determines whether the computational algorithm has an identified category. If not, then storlet scheduler mechanism 514 parses the computational algorithm to identify the operations required within the computational algorithm. Utilizing the identified operations from the computational algorithm and a set of predefined rules for operations, storlet scheduler mechanism 514 identifies a class of each operation such as encryption, seismic processing, mobile/code render operations, compress and store, or the like. With the class of the operation identified, storlet scheduler mechanism 514 determines a category of the computational algorithm based on the identified class from a pre-programmed table of categories and value adds. Examples of category classification of a deployed computational algorithm by the proposed middleware may include:

Computation operations (Encrypt an object)→Encryption category

Computation operations (Mobile development)→Developer category

Computation operations (Seismic data processing) →Arithmetic category

Computation operations (Compress and Store)→Direct Memory category

For each category within the pre-programmed table of categories and value adds, the value adds associated with each category are an optimal set of SAN features, such as preferred SAN features of encryption, Flash acceleration, deduplication, compression, or the like. Utilizing the identified category and value adds associated with the computational algorithm, storlet scheduler mechanism 514 searches the node features 520 associated with each node for features that match the value adds associated with the identified category of the computational algorithm. The result of the search may result in a ranked list of nodes indicating a percentage that each node matches the value adds associated with the identified category of the computational algorithm.

Responsive to determining one or more exact matches of the value adds associated with the identified category of the computational algorithm and a node from the node features 520, storlet scheduler mechanism 514 randomly selects a node from one of the one or more exact matches and determines whether resources associated with the node are immediately available. If the resources are immediately available, then storlet scheduler mechanism 514 issues the computational algorithm to the node for execution. If the resources are not immediately available, then storlet scheduler mechanism 514 selects another of the one or more exact matches and determines whether resources associated with the node are immediately available and repeats the process until all nodes have been checked. If none of the one or more exact match nodes has resources immediately available, storlet scheduler mechanism 514 continues to check each node until one of the nodes has resources available, at which time storlet scheduler mechanism 514 issues the computational algorithm to the node for execution.

Responsive to determining only one exact match of the value adds associated with the identified category of the computational algorithm and a node from the node features 520, storlet scheduler mechanism 514 determines whether resources associated with the node are immediately available. If the resources are immediately available, then storlet scheduler mechanism 514 issues the computational algorithm to the node for execution. If the resources are not immediately available, then storlet scheduler mechanism 514 waits for a predetermined time period for the resources to become available. If the resources become available within the predetermined time period, storlet scheduler mechanism 514 issues the computational algorithm to the node for execution.

If the resources fail to become available within the predetermined time period, then storlet scheduler mechanism 514 may select a next node in the ranked list and determine whether resources associated with the node are immediately available. If the resources are immediately available, then storlet scheduler mechanism 514 issues the computational algorithm to the node for execution. If the resources are not immediately available, then storlet scheduler mechanism 514 waits for a predetermined time period for the resources to become available. If the resources become available within the predetermined time period, storlet scheduler mechanism 514 issues the computational algorithm to the node for execution. Storlet scheduler mechanism 514 repeats the process for each node in the ranked list until the computational algorithm is issued to a node for execution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
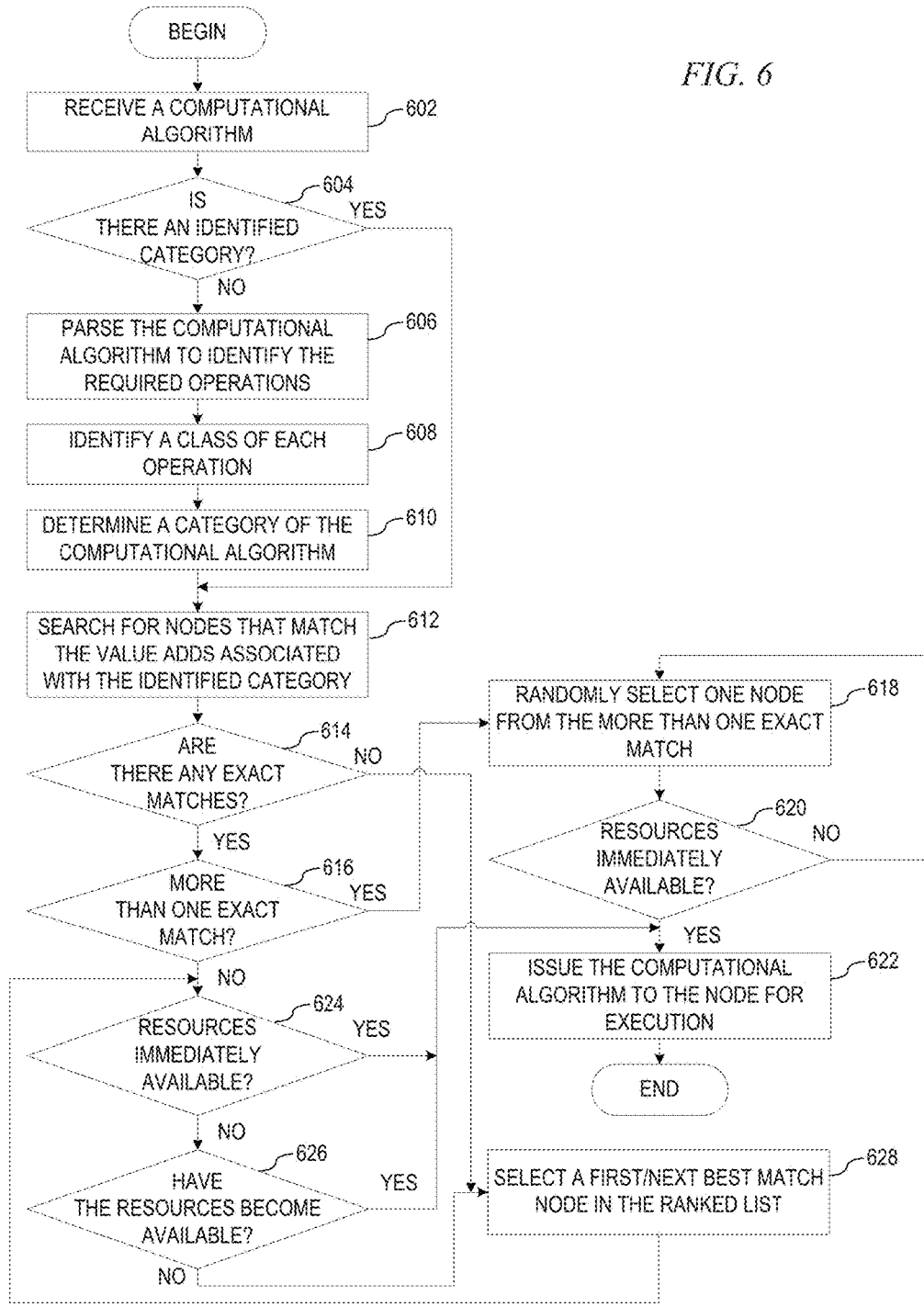
FIG. 6 depicts a flowchart of the operation performed by a storlet scheduler mechanism in optimizing object storage workflow that leverages underlying storage area network value adds in accordance with an illustrative embodiment.

FIG. 6 depicts a flowchart of the operation performed by a storlet scheduler mechanism in optimizing object storage workflow that leverages underlying SAN feature value adds in accordance with an illustrative embodiment. As the operation begins, the storlet scheduler mechanism receives a computational algorithm from a user of one of a set of client devices (step 602). Responsive to receiving a computational algorithm from a user, the storlet scheduler mechanism determines whether the computational algorithm has an identified category (step 604). If at step 604 the computational algorithm fails to have an identified category, the storlet scheduler mechanism parses the computational algorithm to identify the operations required within the computational algorithm (step 606). Utilizing the identified operations from the computational algorithm and a set of predefined rules for operations, the storlet scheduler mechanism identifies a class of each operation (step 608) such as encryption, seismic processing, mobile/code render operations, compress and store, or the like. The storlet scheduler mechanism then determines a category of the computational algorithm based on the identified class from a pre-programmed table of categories and value adds (step 610). For each category within the pre-programmed table of categories and value adds, the value adds associated with each category are an optimal set of SAN features, such as preferred SAN features of encryption, Flash acceleration, deduplication, compression, or the like.

From step 610 or if at step 604 the computational algorithm has an identified category, the storlet scheduler mechanism utilizes the identified category and value adds associated with the computational algorithm to search node features associated with each node for features that match the value adds associated with the identified category of the computational algorithm (step 612). The node features associated with each node may be gathered by the storlet scheduler mechanism receiving and storing SAN feature information powering each infrastructure participating in the object storage cluster as well as the role executed by each node on the infrastructure (i.e. proxy or storage). The information is collected by individual daemons installed on each infrastructure. Each daemon exports the collected information from the node to the storlet scheduler mechanism. Using the collected storage information, for each node, the storlet scheduler mechanism identifies the underlying SAN features (value add features) along with the role served by the node (i.e. proxy or storage). Therefore, for each node on the infrastructure, the storlet scheduler mechanism stores associated SAN features, such as thin provisioning, tiering, compression, deduplication, Flash acceleration support, high/low speed disk rpm support, Active/Active replication, encryption, or the like. The result of the search may result in a ranked list of nodes indicating a percentage that each node matches the value adds associated with the identified category of the computational algorithm.

The storlet scheduler mechanism then determines whether there are any exact matches of the value adds associated with the identified category of the computational algorithm one or more nodes from the node features (step 614). If at step 614 there are one or more exact matches, then the storlet scheduler mechanism determines whether there is more than one exact match (step 616). If at step 616 there is more than one exact match, the storlet scheduler mechanism randomly selects a node from one of the more than one exact match (step 618) and determines whether resources associated with the node are immediately available (step 620). If at step 620 the resources associated with the node are immediately available, then the storlet scheduler mechanism issues the computational algorithm to the node for execution (step 622) with the operation terminating thereafter. If at step 620 the resources are not immediately available, the operation returns to step 618 to select another node from then more than one exact matches. This process is repeated for instances where there is more than one exact match due to performing the computational algorithm on an exact match being preferred.

If at step 616 there is only one exact match, the storlet scheduler mechanism determines whether resources associated with the node are immediately available (step 624). If at step 624 the resources are immediately available, then the operation proceeds to step 622. If at step 624 the resources are not immediately available, then the storlet scheduler mechanism waits for a predetermined time period for the resources to become available (step 626). If at step 626 the resources become available within the predetermined time period, the storlet scheduler mechanism issues the computational algorithm to the node for execution (step 622). If at step 626 the resources fail to become available within the predetermined time period or if at step 614 there are no exact matches, then the storlet scheduler mechanism selects a first/next best match node in the ranked list (step 628) and proceeds/returns to step 624. The storlet scheduler mechanism repeats the process for each node in the ranked list until the computational algorithm is issued to a node for execution. If the end of the list is reached, the storlet scheduler mechanism returns to the top of the list.

Thus, the illustrative embodiments provide mechanisms for improving computation performance and reducing workload on the object storage units in a multi-vendor commodity object storage environment by performing specific workflow changes in the embedded compute engine according to SAN feature value additions such as thin provisioning, tiering, compression, deduplication, Flash acceleration support, high/low speed disk rpm support, Active/Active replication, encryption, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in an object storage (storlet) architecture composing at least one processor and at least one memory, the at least one memory comprising instructions that are executed by the at least one processor to cause the at least one processor to be configured to implement a storlet scheduler mechanism for optimizing object storage workflow, the method comprising:

identifying, by the storlet scheduler mechanism, a category of a computational algorithm received from a user of a client device via a load balancer, wherein the category identifies a set of storage area network (SAN) features that are optimal for executing the computational algorithm and wherein the set of SAN features comprise one or more of thin provisioning, tiering, compression, deduplication, Flash acceleration support, high/low speed disk rpm support, Active/Active replication, or encryption;

searching, by the storelet scheduler mechanism, SAN features associated with a plurality of nodes in a plurality of infrastructures in the object storage architecture for at least one node that has the set of SAN features identified by the category of the computational algorithm, wherein the SAN features associated with each node in the plurality of nodes in the plurality of infrastructures are received from a daemon, installed by the storlet scheduler mechanism in each infrastructure of the plurality of infrastructures, that collects the respective SAN features associated with the node and exports the SAN features to the storlet scheduler mechanism;

responsive to identifying a node that has the set of SAN features, identified by the category of the computational algorithm, determining, the storlet scheduler mechanism, whether resources associated with the node are immediately available; and responsive to the resources associated with the node being immediately available, executing the computational algorithm at the node after the storlet scheduler mechanism issues the computational algorithm to the node, wherein execution of the computational algorithm returns results to the user of the client device via the load balancer.

2. The method of claim 1, wherein the category of the computational algorithm is predefined and received with the computational algorithm.

3. The method of claim 1, wherein the category of the computational algorithm is undefined when the computational algorithm is received and wherein the category is identified by the method comprising:

parsing, by the storlet scheduler mechanism, the computational algorithm to identify a set of operations required within the computational algorithm;

identifying, by the storlet scheduler mechanism, a class of each operation in the set of operations using a set of predefined rules for operations; and determining, by the storlet scheduler mechanism, the category of the computational algorithm based on the identified classes from a pre-programmed table of categories and value adds, wherein the value adds associated with each category are an optimal set of SAN features.

4. The method of claim 1, further comprising:

responsive to the resources associated with the at least one node failing to be immediately available, waiting by the storlet scheduler mechanism a predetermined time period for the resources to become available; and responsive to the resources associated with the at least one node becoming available within the predetermined time period, issuing, by the storlet scheduler mechanism, the computational algorithm to the node for execution, wherein execution of the computational algorithm returns results to the user via the client device.

5. The method of claim 4, further comprising:

responsive to the resources associated with the at least one node failing to become available within the predetermined time period, identifying, by the storlet scheduler mechanism, at least one other node that has the set of SAN features identified by the category of the computational algorithm or substantially has the set of SAN features identified by the category of the computational algorithm within a predetermined threshold;

responsive to identifying the at least one other node, determining, by the storlet scheduler mechanism, whether resources associated with the at least one other node are immediately available; and responsive to the resources associated with the at least one other node being immediately available, issuing, by the storlet scheduler mechanism, the computational algorithm to the node for execution.

6. The method of claim 1, further comprising:

responsive to identifying a plurality of nodes that have the set of SAN features identified by the category of the computational algorithm, randomly selecting, by the storlet scheduler mechanism, a node from the plurality of nodes that have the set of SAN features identified by the category of the computational algorithm;

determining, by the storlet scheduler mechanism, whether resources associated with the randomly selected node are immediately available; and responsive to the resources associated with the randomly selected node being immediately available, issuing, by the storlet scheduler mechanism, the computational algorithm to the randomly selected node for execution.

7. The method of claim 6, further comprising:

responsive to the resources associated with the randomly selected node failing to become available within a predetermined time period, randomly selecting, by the storlet scheduler mechanism, another node from the plurality of nodes that have the set of SAN features identified by the category of the computational algorithm;

repeating, by the storlet scheduler mechanism, the determining of whether resources associated with the other randomly selected node are immediately available until a node within the plurality of nodes that have the set of SAN features identified by the category of the computational algorithm has resources that are immediately available; and responsive to the resources associated with the node within the plurality of nodes that have the set of SAN features identified by the category of the computational algorithm being immediately available, issuing, by the storlet scheduler mechanism, the computational algorithm to the randomly selected node for execution.

8. A computer program product comprising a computer readable storage medium having a computer readable program stored therein, wherein the computer readable program, when executed on a computing device, causes the computing device to implement a storlet scheduler mechanism for optimizing object storage (storlet) workflow, and further causes the computing device to:

identify, by the storlet scheduler mechanism, a category of a computational algorithm received from a user of a client device via a load balancer, wherein the category identifies a set of storage area network (SAN) features that are optimal for executing the computational algorithm and wherein the set of SAN features comprise one or more of thin provisioning, tiering, compression, deduplication, Flash acceleration support, high/low speed disk rpm support, Active/Active replication, or encryption;

search, by the storlet scheduler mechanism, SAN features associated with a plurality of nodes in a plurality of infrastructures in the object storage architecture for at least one node that has the set of SAN features identified by the category of the computational algorithm, wherein the SAN features associated with each node in the plurality of nodes in the plurality of infrastructures are received from a daemon, installed by the, storlet scheduler mechanism in each infrastructure of the plurality of infrastructures, that collects the respective SAN features associated with the node and exports the SAN features to the storlet scheduler mechanism;

responsive to identifying a node that has the set of features identified by the category of the computational algorithm, determine, by the storlet scheduler mechanism, whether resources associated with the node are immediately available; and responsive to the resources associated with the node being immediately available, execute the computational algorithm at the node after the storlet scheduler mechanism issues the computational algorithm to the node, wherein execution of the computational algorithm returns results to the user of the client device via the toad balancer.

9. The computer program product of claim 8, wherein the category of the computational algorithm is predefined and received with the computational algorithm.

10. The computer program product of claim 8, wherein the category of the computational algorithm is undefined when the computational algorithm is received and wherein the computer readable program identifies the category by causing the computing device to:

parse, by the storlet scheduler mechanism, the computational algorithm to identify a set of operations required within the computational algorithm;

identify, by the storlet schedule mechanism, a class of each operation in the set of operations using a set of predefined rules for operations; and determine, by the storlet scheduler mechanism, the category of the computational algorithm based on the identified classes from a pre-programmed table of categories and value adds, wherein the value adds associated with each category are an optimal set of SAN features.

11. The computer program product of claim 8, wherein the computer readable program further causes the computing device to:

responsive to the resources associated with the at least one node failing to be immediately available, wait by the storlet scheduler mechanism, a predetermined time period for the resources to become available; and responsive to the resources associated with the at least one node becoming available within the predetermined time period, issue, by the storlet scheduler mechanism the computational algorithm to the node for execution, wherein execution of the computational algorithm returns results to the user via the client device.

12. The computer program product of claim 11, wherein the computer readable program further causes the computing device to:

responsive to the resources associated with the at least one node failing to become available within the predetermined time period, by the storlet scheduler mechanism, at least one other node that has the set of SAN features identified by the category of the computational algorithm or substantially has the set of SAN features identified by the category of the computational algorithm within a predetermined threshold;

responsive to identifying the at least one other node, determine, by the storlet scheduler mechanism, whether resources associated with the at least one other node are immediately available; and responsive to the resources associated with the at least one other node being immediately available, issue, by the storlet scheduler mechanism, the computational algorithm to the node for execution.

13. The computer program product of claim 8, wherein the computer readable program further causes the computing device to:

responsive to identifying a plurality of nodes that have the set of SAN features identified by the category of the computational algorithm, randomly select, by the storlet scheduler mechanism, a node from the plurality of nodes that have the set of SAN features identified by the category of the computational algorithm;

determine, by the storlet scheduler mechanism, whether resources associated with the randomly selected node are immediately available; and responsive to the resources associated with the randomly selected node being immediately available, issue, by the storlet scheduler mechanism, the computational algorithm to the randomly selected node for execution.

14. The computer program product of claim 13, wherein the computer readable program further causes the computing device to:

responsive to the resources associated with the randomly selected node failing to become available within a predetermined time period, randomly select, by the storlet scheduler mechanism, another node from the plurality of nodes that have the set of features identified by the category of the computational algorithm;

repeat, by the storlet scheduler mechanism, the determining of whether resources associated with the randomly selected node are immediately available until a node within the plurality of nodes that have the set of features identified by the category of the computational algorithm has resources that are immediately available; and responsive to the resources associated with the node within the plurality of nodes that have the set of features identified by the category of the computational algorithm being immediately available, issue, by the storlet scheduler mechanism, the computational algorithm to the randomly selected node for execution.

15. An apparatus comprising:

a processor, and a memory coupled to the processor, wherein the memory comprises instructions which, when executed by the processor, cause the processor to implement a storlet scheduler mechanism for optimizing object storage (storlet) workflow, and further causes the processor to:

identify, by the storlet scheduler mechanism, a category of a computational algorithm; received from a user of a client device via a load balancer, wherein the category identifies a set of storage area network (SAN) features that are optimal for executing the computational algorithm and wherein the set of SAN features comprise one or more of thin provisioning, tiering, compression, deduplication, Flash acceleration support, high/low speed disk rpm support, Active/Active replication, or encryption;

search, by the storlet scheduler mechanism, SAN features associated with a plurality of nodes in a plurality of infrastructures in the object storage architecture for at least one node that has the set of SAN features identified by the category of the computational algorithm, wherein the SAN features associated with each node in the plurality of nodes in the plurality of infrastructures are received from a daemon installed by the storlet scheduler mechanism in each infrastructure of the plurality of infrastructures, that collects the respective SAN features associated with the node and exports the SAN features to the storlet scheduler mechanism;

responsive to identifying a node that has the set of features identified by the category of the computational algorithm, determine, by the storlet scheduler mechanism, whether resources associated with the node are immediately available; and responsive to the resources associated with the node being immediately available, execute the computational algorithm at the node after the storlet scheduler mechanism issues the computational algorithm to the node, wherein execution of the computational algorithm returns results to the user of the client device via the load balancer.

16. The apparatus of claim 15, wherein the category of the computational algorithm is predefined and received with the computational algorithm.

17. The apparatus of claim 15, wherein the category of the computational algorithm is undefined when the computational algorithm is received and wherein the instructions identify the category by causing the processor to:

parse, by the storlet scheduler mechanism, the computational algorithm to identify a set of operations required within the computational algorithm;

identify, by the storlet scheduler mechanism, a class of each operation in the set of operations using a set of predefined rules for operations; and determine, by the storlet scheduler mechanism, the category of the computational algorithm based on the identified classes from a pre-programmed table of categories and value adds, wherein the value adds associated with each category are an optimal set of SAN features.

18. The apparatus of claim 15, wherein the instructions further cause the processor to:

responsive to the resources associated with the at least one node failing to be immediately available, wait, by the storlet scheduler mechanism, a predetermined time period for the resources to become available; and responsive to the resources associated with the at least one node becoming available within the predetermined time period, issue, by the storlet scheduler mechanism, the computational algorithm to the node for execution, wherein execution of the computational algorithm returns results to the user via the client device.

19. The apparatus of claim 18, wherein the instructions further cause the processor to:

responsive to the resources associated with the at least one node failing to become available within the predetermined time period, by the storlet scheduler mechanism, at least one other node that has the set of SAN features identified by the category of the computational algorithm or substantially has the set of SAN features identified by the category of the computational algorithm within a predetermined threshold;

responsive to identifying the at least one other node, determine, by the storlet scheduler mechanism, whether resources associated with the at least one other node are immediately available; and responsive to the resources associated with the at least one other node being immediately available, issue, by the storlet scheduler mechanism, the computational algorithm to the node for execution.

20. The apparatus of claim 15, wherein the instructions further cause the processor to:

responsive to identifying a plurality of nodes that have the set of SAN features identified by the category of the computational algorithm, randomly select, by the storlet scheduler mechanism, a node from the plurality of nodes that have the set of SAN features identified by the category of the computational algorithm;

determine, by the storlet scheduler mechanism, whether resources associated with the randomly selected node are immediately available; and responsive to the resources associated with the randomly selected node being immediately available, issue, by the storlet scheduler mechanism, the computational algorithm to the randomly selected node for execution.

* * * * *